Oct. 29, 1968  A. GABOR  3,408,556
TACHOMETER

Filed Oct. 20, 1965

INVENTOR
ANDREW GABOR

BY *Lane, Aitken, Dunner & Ziems*
ATTORNEYS

Oct. 29, 1968   A. GABOR   3,408,556
TACHOMETER
Filed Oct. 20, 1965
2 Sheets-Sheet 2

INVENTOR
ANDREW GABOR

BY
Lane, Aitken, Dunner & Ziems
ATTORNEYS

United States Patent Office 3,408,556
Patented Oct. 29, 1968

3,408,556
TACHOMETER
Andrew Gabor, Huntington, N.Y., assignor to Potter Instrument Company, Inc., Plainview, N.Y., a corporation of New York
Filed Oct. 20, 1965, Ser. No. 498,377
10 Claims. (Cl. 322—95)

ABSTRACT OF THE DISCLOSURE

This specification discloses a tachometer having a rotor and stator with poles conforming to rectangular sections of concentric cylinders. The tachometer produces output pulses having flat tops which are rectified and combined in parallel into a common output. The stator and rotor poles are arranged so that the pulses are produced in sequence overlapping in their flat topped portions. This results in a ripple free output from the tachometer.

---

This invention relates to tachometers and more particularly to a tachometer of the type producing a DC output signal voltage proportional to the input angular speed.

The present invention provides a tachometer with increased accuracy because sinusoidal ripple in the output signal voltage of the tachometer has been substantially eliminated. In addition, the tachometer of the present invention does not employ a commutator and hence commutator noise as a source of inaccuracy has been eliminated.

The tachometer of the present invention comprises a magnetized stator and an armature made of low reluctance material. Coils are wound on the stator and as the armature rotates signals are generated in the stator coils. The signals generated in the stator coils are rectified and the rectified outputs are connected together to provide a common output. The armature and the stator are provided with co-acting poles which are shaped so that the rate of change of flux through the stator windings is constant over the major portion of each cycle of flux change. As a result, the signal voltage produced in each stator coil is in the form of flat-topped pulses. The poles and stator coils are arranged so that the flat-topped pulses from the windings are out of phase and overlap in a manner to eliminate the effects of the leading and trailing edges of the flat-topped pulses in the output of the tachometer. Accordingly, the tachometer produces an output signal voltage proportional to the armature speed of rotation with no commutator noise and substantially no sinusoidal ripple in the output signal voltage. As a result, the tachometer of the present invention produces an output signal voltage representative of the input armature speed with a high degree of accuracy.

Accordingly, an object of the present invention is to increase the accuracy of tachometers.

Another object of the present invention is to provide a tachometer with increased accuracy.

A further object of the present invention is to provide an improved tachometer of the type which produces a DC output signal voltage representing the angular input speed.

A still further object of the present invention is to substantially eliminate the sinusoidal ripple in the output signal voltage of a DC tachometer.

A still further object of the present invention is to provide a tachometer in which commutator noise has been eliminated from the output signal voltage and sinusoidal ripple has been substantially eliminated from the output signal voltage.

Figure 1:
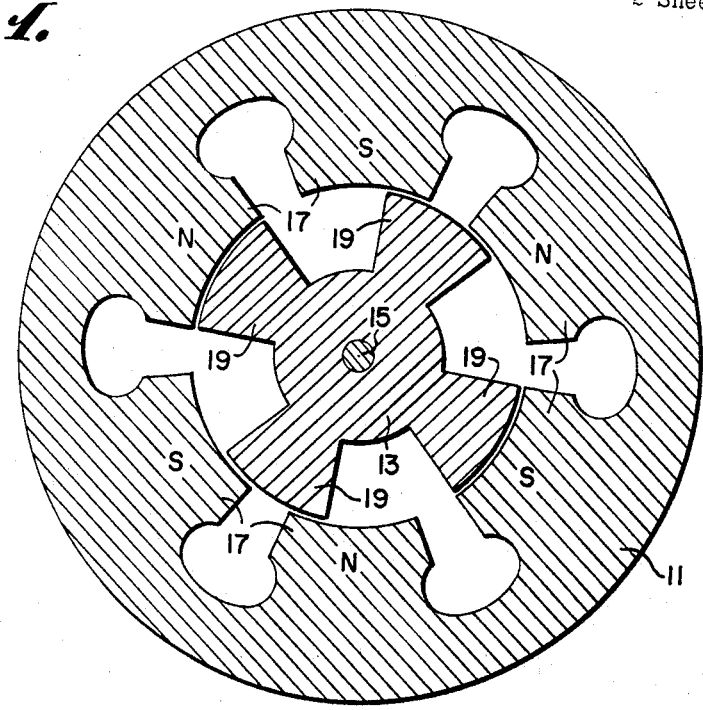
Figure 2:
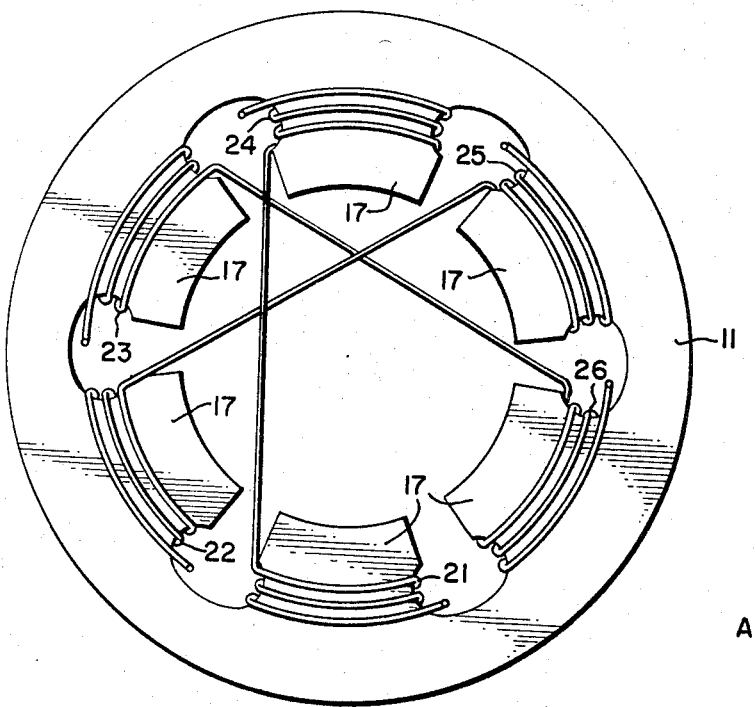
Figure 3:
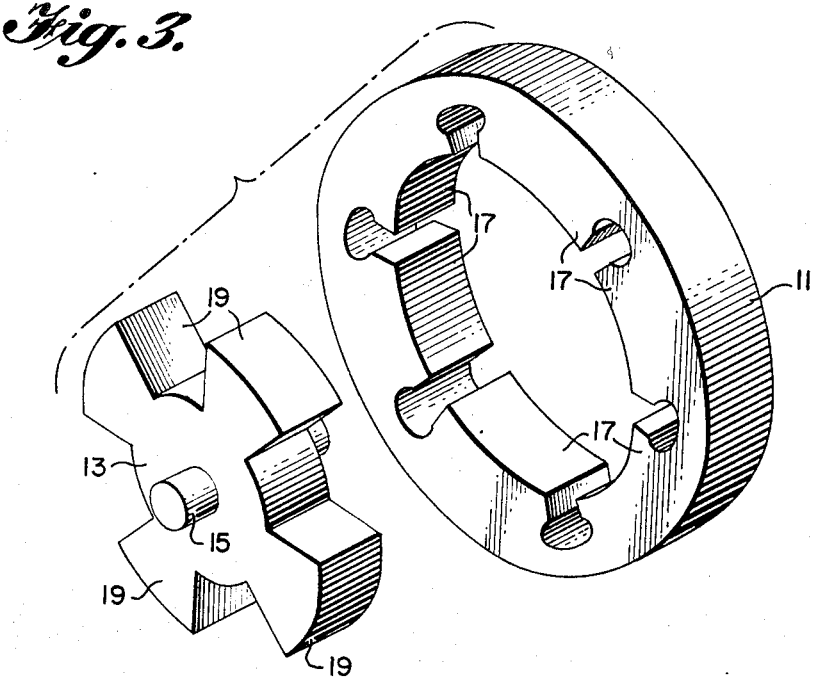
Figure 4:
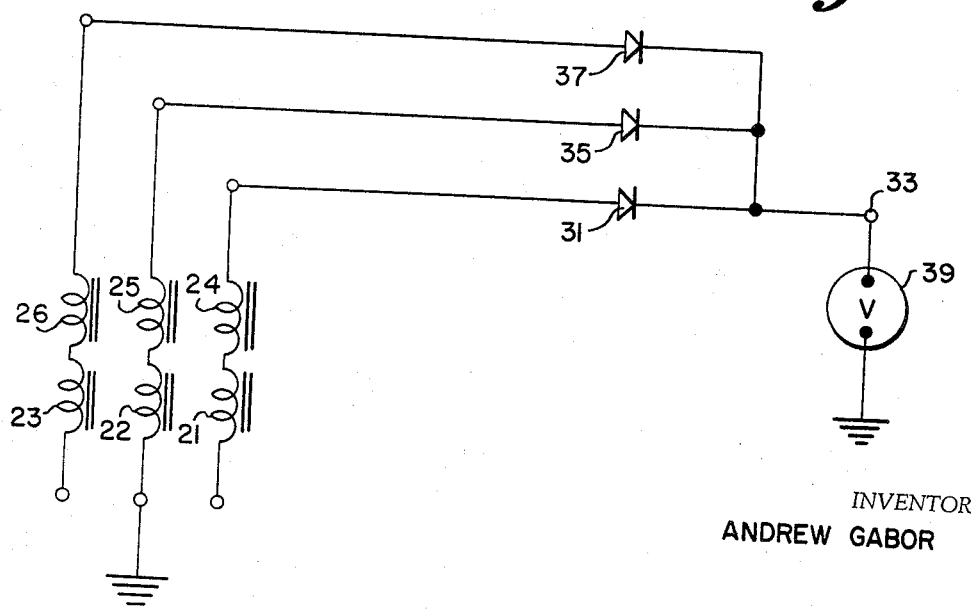

Further objects and advantages of the present invention will become readily apparent as the following detailed description of the invention unfolds when taken in conjunction with the drawings, wherein:

FIG. 1 is a cross-sectional view of the stator and armature structure of the tachometer of the present invention;

FIG. 2 schematically illustrates how the stator coils are wound on the stator of the tachometer of the present invention;

FIG. 3 is an exploded view of the stator and armature illustrating the shapes of the stator and armature poles; and FIG. 4 illustrates how the stator coils are connected to rectifiers and to a common output to provide the output signal voltage representing the input armature speed.

As shown in FIG. 1, the tachometer of the present invention comprises a permanently magnetized stator 11 and an armature 13, which is made of a material of low magnetic reluctance such as soft iron. The armature is made of a material suitable for permanent magnetization. The armature is rotatably mounted by means of an axle 15 to be free to rotate within the stator 11. The stator 11 has six poles 17 which are evenly distributed about the axis of the armature and which face radially inward toward the axis of the armature. Three of the poles 17 are magnetized to be north poles and three of the poles are magnetized to be south poles as indicated on the poles by letters N and S, which designate north and south poles respectively. As shown in FIG. 1, the poles 17 alternate in the polarity of their magnetization. As pointed out above, the stator is permanently magnetized to provide the magnetic poles 17. Alternatively, the stator could be electrically excited to provide the desired magnetization of the poles by means of coils provided for this purpose.

The armature is provided with four poles 19 facing radially outward evenly distributed about the axis of the armature. The faces of the armature poles have substantially the same dimension and the same shape as the stator poles. As the armature rotates, the armature poles come into alignment with and pass closely adjacent to the stator poles.

As shown in FIG. 2, a stator coil is wound around each of the stator poles. Since there are six stator poles, there are six stator coils, which are designated by the reference numbers 21–26. The armature provides a low reluctance path for the magnetic flux passing from the north stator poles to the south stator poles. As the armature rotates, it varies the reluctance of the low reluctance path between the stator poles so that the flux linking each of the stator coils varies as the armature rotates. As an armature pole passes over a stator pole, the flux through the coil wound around the stator pole, for a given armature speed, will first increase at a constant rate and then decrease at a constant rate. The flux will start increasing at a constant rate when the armature pole first overlaps the stator pole and will continue to increase at a constant rate until the armature pole comes into alignment with the stator pole. The flux linking the coil on the stator pole will then decrease at a constant rate until the armature pole no longer overlaps the stator pole. As a result, there will be generated in the coil wound around the stator pole a flat-topped pulse of one polarity followed by a flat-topped pulse of the opposite polarity. Although the rate of increase and decrease of flux linking a stator coil is constant for given armature speed as an armature pole passes by a stator pole, the rate of change of flux will be proportional to the armature speed. As a result, the amplitude of the flat-topped pulses produced by the coils will be proportional to armature speed.

As best illustrated in FIG. 3, the constant rate of flux change is achieved by using armature and stator poles which are rectangular in shape when viewed radially. The pole faces are not truly rectangular because they are curved, as illustrated in FIG. 1. The stator pole faces are sections of one cylindrical surface and the armature pole faces are sections of a second cylindrical surface. Because the cylindrical sections comprising the pole faces are rectangular when viewed radially, their shape shall be referred to as being rectangular sections of cylindrical surfaces.

The face that the pole faces are shaped in the manner described above results in the flux linking the stator coils changing at a constant rate because the area of overlap between a stator pole and an armature pole passing by changes at a constant rate for a given armature speed, until the rotor pole is in first increasing at a constant rate until the rotor pole is in alignment with the stator pole and then decreasing at a constant rate. As a result, the effective size of the air gap between the armature and stator pole first increases at a constant rate and then decreases at a constant rate. This makes the flux linking the coil wound on the stator pole increase at a constant rate and then decrease at a constant rate, thus causing the flat-topped pulses to be generated in the stator coil.

As a pole of the armature approaches a pole of the stator, before the armature pole overlaps the stator pole, there will be some increase in the flux linking the coil of the stator pole which is not at a constant rate. This initial increase in flux will be at a lower rate of increase than the constant rate of increase that occurs while the armature pole overlaps the stator pole and is approaching the position of alignment with the stator pole. This non-constant rate of increase of flux provides a sloping leading edge to the pulse produced by the increasing flux linking a stator coil. Similarly, the flux linking the coil of a stator pole with continue to decrease at a lower rate which is not constant for a short period of time as the armature pole moves away from the stator pole immediately after it no longer overlaps the stator pole. This non-constant decrease in flux will cause a sloping trailing edge to the pulse produced by the decreasing flux linking the stator coil. Because the constant rate of increase and constant rate of decrease of flux that occurs while the armature pole overlaps the stator pole will also be the maximum rate of increase and the maximum rate of decrease, the pulses produced by the increase and decrease of flux as an armature pole passes by a stator pole will have flat tops.

Because of the way the armature and stator pole faces are shaped and because the pole faces of the stator are wide relative to the gaps between the pole faces, the major portion of the flux increase linking the coil of a stator pole as an armature pole passes by will be at the constant maximum rate and the major portion of the flux decrease will be at a constant maximum rate. As a result, the sloping leading edge of the pulse produced by the flux increase will occupy a small part of the pulse and the trailing edge of the following pulse produced by the flux decrease will occupy a small part of this pulse.

As illustrated in FIG. 2, the coils wound on each pair of opposite poles, that is, the poles facing each other, are connected in series. Thus the coil 21 is connected in series with the coil 24, the coil 22 is connected in series with the coil 25, and the coil 23 is connected in series with the coil 26. As can be seen from FIG. 1, each time an armature pole passes a given stator pole another armature pole will also be passing the opposite stator pole. Accordingly, pulses will be produced in each pair of series connected coils simultaneously. The coils are connected so that the pulses produced in each coil of the series circuit will add together; in other words, the coils are connected in series aiding.

FIG. 4 illustrates how the three series circuits of the coils 21 through 26 are connected together to provide the tachometer output. One side of each of the series circuits is connected to ground. The other side of the series of the coils 21 and 24 is connected through a rectifying diode 31 to an output terminal 33. The other side of the series circuit of the coils 22 and 25 is connected through a rectifying diode 35 to the output terminal 33 and the other side of the series circuit of the coils 23 and 26 is connected through a rectifying diode 37 to the output terminal 33. The rectifying diodes 31, 35 and 37 are poled to pass positive pulses from the three series circuits of the coils 21 through 26 to the output terminal 33.

Since the amplitude of the pulses produced in the coils 21 through 26 is proportional to the armature speed of rotation, the voltage produced at the output 33 will be proportional to the speed of rotation. A voltmeter 39 is connected between the output 33 and ground to read the output voltage and thus provide an indication of the speed of rotation of the armature 13.

The coils 21–26 are connected with polarities so that the series circuits of the coils 21–26 will produce positive pulses while flux is increasing in the coils and will produce negative pulses while flux is decreasing in the coils. As the armature rotates, the three series circuits of the coils 21–26 will produce positive output pulses in sequence. Because the width of the gaps between stator poles is less than half the width of the armature poles, the pulses produced will overlap and the overlapping will be to the extent that the flat top of each succeeding positive pulse will commence before the flat top of the preceding positive pulse ends. The voltage produced at the output 33 will be maintained at the highest output positive voltage produced by the three series circuits of the coils 21–26. Accordingly, the sloping leading edge of each positive pulse will not have any effect or cause any ripple in the voltage produced at the output 33 because the sloping leading edge of each positive pulse will be generated simultaneously with part of the flat-topped portion of the preceding pulse, which flat-topped portion will control the voltage output and thus cancel the effect of the leading edge. In a similar manner the effect of any trailing edge on each positive pulse will be cancelled. Thus, because the rotor and stator are shaped to produce flat-topped output pulses which overlap in the regions of their flat tops, the tachometer of the present invention produces a D.C. output voltage in which the output ripple has been substantially eliminated. Also, since the tachometer does not use commutators, the effect of commutator noise has been eliminated. Accordingly, voltage produced at the output 33 and read by the voltmeter 39 will be precisely proportional to and precisely represent the speed of rotation of the armature and thus the input angular speed of the tachometer.

If desired, instead of half-wave rectifying the outputs of the three series circuits of the coils 21–26, full-wave rectifiers could be used. Such an arrangement would increase the power of the output voltage of the tachometer. Also, if such an arrangement were used the gaps between the stator poles could be widened up to the width of the poles of the armature. Such an arrangement, however, would not eliminate the effects of any ripple due to any slope which may exist between the positive pulse produced by the increasing flux and the negative pulse produced by the decreasing flux as a pole of the armature passes by a pole of the stator. Of course the number of poles on the armature and stator may be varied if desired. Preferably the armature should have an even number of poles and the number of stator poles should be 1.5 times the number of armature poles. This ratio makes it convenient to design the rotor and stator so that for all positions of the armature the face of at least one of the armature poles will be in overlapping relationship with one of the stator poles so that one of the stator coils will be generating a flat-topped pulse. These and many other modifications may be made to the above-described specific embodiment of the invention without departing from the spirit and scope of the invention, which is defined in the appended claims.

The invention claimed is:

1. A tachometer comprising
a stator,
an armature rotatable with respect to said stator about an axis,
said stator having a plurality of magnetic poles distributed about the axis of said armature facing said armature,
said armature being made of low reluctance magnetic material and having a plurality of poles distributed about the axis thereof facing said stator, and
a plurality of coils wound on said stator,
said armature and said stator poles being shaped and arranged so as to constitute means for inducing waveforms in said stator coils as said armature rotates about said axis which waveforms are flat-topped pulses with pulses from different coils being produced in sequence and overlapping in their flat topped portions.

2. A tachometer comprising
a stator,
an armature rotatable with respect to said stator about an axis,
said stator having a plurality of magnetic poles distributed about the axis of said armature facing said armature,
said armature being made of low reluctance material and having a plurality of poles distributed about the axis thereof facing said stator,
a plurality of coils wound on said stator, and
circuit means to rectify the outputs of said coils and to combine the resulting rectified outputs in parallel into a common output,
said rotor and said stator poles being shaped and arranged so as to constitute means for inducing waveforms in said coils as said armature rotates which waveforms comprise flat-topped pulses with the pulses from the different coils being produced in sequence and overlapping in their flat-topped portions.

3. A tachometer comprising
an armature made of low reluctance material rotatable about an axis and having a plurality of poles distributed about said axis,
a stator having a plurality of magnetic poles extending toward said armature facing said armature poles and distributed about said axis,
a plurality of coils wound on said stator,
said armature and said stator poles being shaped so as to constitute means for inducing waveforms in said coils when said armature rotates which waveforms comprise flat-topped pulses,
said armature and said stator poles being arranged with respect to each other so that in all positions of said armature at least one of said armature poles has its face in overlapping relationship with one of said stator poles so that an edge of the face of such armature pole lies between the edges of the face of such stator pole and vice versa, and
circuit means to rectify the outputs of said coils and combine the resulting rectified outputs in parallel into a common output.

4. A tachometer comprising
an armature made of low reluctance material rotatable about an axis and having a plurality of radially extending poles distributed about said axis, said poles having faces conforming to rectangular sections of a first cylinder concentric about said axis,
a stator having a plurality of magnetic poles extending radially with respect to said axis toward said armature and distributed about said axis, the faces of said stator poles conforming to rectangular sections of a second cylinder slightly larger than said first cylinder, the width of said stator poles in the angular direction being substantially greater than the gaps between said stator poles, and a plurality of coils wound on said stator,
whereby said coils produce flat topped pulses as said armature rotates,
said armature and stator poles being arranged so that pulses from different coils are produced in sequence and overlap in their flat-topped portions.

5. A tachometer as recited in claim 4 wherein there is provided circuit means to rectify the outputs of said coils and to combine the rectified outputs in parallel into a common output.

6. A tachometer comprising
an armature made of low reluctance material rotatable about an axis and having a plurality of radially extending poles distributed about said axis, said poles having faces conforming to rectangular sections of the first cylinder concentric about said axis,
a stator having a plurality of magnetic poles extending radially with respect to said axis toward said armature and distributed about said axis, the faces of said stator poles conforming the rectangular sections of a second cylinder slightly larger than said first cylinder, the poles of said armature being arranged with respect to the poles of said stator so that in all positions of said armature at least one of said armature poles has its face in overlapping relationship with one of said stator poles so that an edge of the face of such armature pole lies between the edges of the face of such stator pole and vice versa,
a plurality of coils wound on said stator, and circuit means to rectify the output of said coils and combine their resulting rectified outputs in parallel into a common output.

7. A tachometer comprising
an armature made of low reluctance material rotatable about an axis having a plurality of poles distributed about said axis,
a stator having a plurality of magnetic poles extending toward said armature facing said armature poles and distributed about said axis,
a plurality of coils severally wound on said stator poles,
said armature and said stator poles being shaped so as to constitute means to induce waveforms in said coils when said armature rotates which waveforms comprise flat-topped pulses,
said armature and said stator poles being arranged with respect to each other so that in all positions of said armature at least one of said armature poles has its face in overlapping relationship with one of said stator poles so that an edge of the face of such armature pole lies between the edges of the face of such stator pole and vice versa, and
circuit means to rectify the outputs of said coils and combine the resulting rectified outputs in parallel into a common output.

8. A tachometer comprising
an armature made of low reluctance material rotatable about an axis an having a plurality of poles distributed about said axis,
a stator having a plurality of magnetic poles extending toward said armature facing said armature poles and distributed about said axis,
a plurality of coils wound on said stator,
said armature and said stator poles being arranged with respect to each other so that in all positions of said armature at least one of said armature poles has its face in overlapping relationship with one of said stator poles so an edge of the face of such armature pole lies between the edges of the face of such stator pole and vice versa,
said armature and stator pole faces being shaped so that the area of overlap between the overlapping armature and stator poles changes at a constant rate and the distance across the air gap between the poles in the area of overlap remains constant, and
circuit means to rectify the outputs of said coils and combine the resulting rectified outputs in parallel into a common output.

9. A tachometer comprising
an armature made of low reluctance material rotatable about an axis and having a plurality of radially extending poles distributed at equal angular intervals about the axis of said armature, said poles having faces shaped to conform to rectangular sections of a first cylinder concentric about the axis of said armature,
a stator surrounding said armature having a plurality of magnetic poles facing radially inward toward said armature distributed at equal angular intervals about the axis of said armature, the faces of said stator poles conforming to rectangular sections of a second cylinder concentric about the axis of said armature slightly larger than said first cylinder, the faces of said stator poles being substantially the same size as the faces of said armature poles and having widths in the angular direction about the axis of said armature substantially greater than the gaps between said stator poles,
stator coils wound on said stator poles, and
circuit means to rectify the signal voltages induced in said stator windings and combine them in parallel into a common output.

10. A tachometer comprising
an armature made of low reluctance material rotatable about an axis and having N radially extending poles distributed at equal angular intervals about the axis of said armature, said armature poles having faces conforming to rectangular sections of a first cylinder concentric about the axis of said armature,
a stator surrounding said armature having 1.5 N magnetic poles facing radially inward toward said armature distributed at equal angular intervals about the axis of said armature, the faces of said stator poles conforming to rectangular sections of a second cylinder concentric about the axis of said armature slightly larger in diameter than said first cylinder, the faces of said stator poles being substantially the same size as said armature poles and having widths in the angular direction about the axis of said armature greater than twice the gaps between said stator poles,
a stator coil wound on each of said stator poles, circuit means connecting the coils on opposite poles in series to provide three series circuits,
circuit means defining an output, and
a rectifying diode for each of said series circuits connecting such series circuit to said output.

References Cited

UNITED STATES PATENTS

| | | | |
|---|---|---|---|
| 1,234,914 | 7/1917 | Latour | 310—168 |
| 1,898,728 | 2/1933 | Huff | 310—155 |
| 1,996,947 | 4/1935 | Beeh | 310—155 |
| 2,945,141 | 7/1960 | Van de Graaff et al. | 310—168 X |
| 3,217,194 | 11/1965 | Terry et al. | 310—168 X |
| 3,264,504 | 8/1966 | Lamorlette | 310—168 |

FOREIGN PATENTS

| | | |
|---|---|---|
| 577,038 | 5/1946 | Great Britain. |
| 521,617 | 5/1940 | Great Britain. |

ORIS L. RADER, *Primary Examiner.*

HAROLD HUBERFELD, *Assistant Examiner.*